US010033812B2

(12) United States Patent
Xu et al.

(10) Patent No.: US 10,033,812 B2
(45) Date of Patent: Jul. 24, 2018

(54) FRAMEWORK FOR DISTRIBUTED KEY-VALUE STORE IN A WIDE AREA NETWORK

(71) Applicant: VMware, Inc., Palo Alto, CA (US)

(72) Inventors: Yuehai Xu, San Jose, CA (US); Enning Xiang, San Jose, CA (US); Mukund Srinivasan, Lexington, MA (US); Jorge Guerra Delgado, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 299 days.

(21) Appl. No.: 14/850,220

(22) Filed: Sep. 10, 2015

(65) Prior Publication Data

US 2017/0078387 A1   Mar. 16, 2017

(51) Int. Cl.
*G06F 15/16* (2006.01)
*H04L 29/08* (2006.01)
*H04L 12/18* (2006.01)
*H04L 29/06* (2006.01)

(52) U.S. Cl.
CPC .......... *H04L 67/1097* (2013.01); *H04L 12/18* (2013.01); *H04L 12/1886* (2013.01); *H04L 69/18* (2013.01)

(58) Field of Classification Search
CPC .............. H04L 67/2842; H04L 1/1835; G06F 13/1673
See application file for complete search history.

(56) References Cited

U.S. PATENT DOCUMENTS

2015/0074115 A1* 3/2015 Vasu ................. G06F 17/30575
707/741
2016/0191509 A1* 6/2016 Bestler .................... G06F 3/067
713/163

* cited by examiner

*Primary Examiner* — Tauqir Hussain
*Assistant Examiner* — Kamran Mohammadi

(57) ABSTRACT

A distributed key-value storage system may include a master node. The key-value store may be distributed among first and second nodes. The master node may receive a publish request to publish one or more key-value pairs. Each key-value pair may be stored in a retransmit buffer and sent to all the first nodes using a communication protocol of a first kind that does not include a retransmit protocol mechanism. Some of the key-value pairs may be sent to one or more second node using a communication protocol of a second kind that includes a retransmit protocol mechanism.

18 Claims, 6 Drawing Sheets

FRAMEWORK FOR DISTRIBUTED KEY-VALUE STORE IN A WIDE AREA NETWORK

BACKGROUND

A key-value data store allows users to store and retrieve data in the form of key-value pairs. The "key" in a key-value pair may be referred to as an index (e.g., a number, string, etc.) that uniquely identifies its paired value. The "value" in a key-value pair can be an arbitrary block of data and may comprise any type of data object or collection of data objects. A typical key-value store may expose three operations to users: PUT, GET, and DELETE. The PUT operation may be invoked to store one or more specified key-value pairs in the key-value store. The GET operation may be used to retrieve the values for one or more specified keys from the key-value store. The DELETE operation may delete key-value pairs identified by one or more specified keys from the key-value store.

Some key-value stores may be distributed. A distributed key-value storage system allows users to invoke key-value operations such as PUT, GET, and DELETE, on any one of a set of distinct computers (either physical or virtual) referred to as "nodes." A distributed key-value store may be implemented in a data center having several nodes. Some of the nodes may have a copy of the key-value store, thus allowing for high speed access. A consensus algorithm may be used to coordinate a reliable replication of a key-value store among several nodes. This kind of distributed key-value store conventionally assumes the nodes are connected by high-throughput, low-latency connections, which is typically the case in a data center.

However, in a distributed configuration over a wide area network, portions of the key-value store may be stored in nodes outside of the data center. The assumption of a high-throughput, low-latency connections with such nodes is not guaranteed. Nodes outside of a data center may be geographically separated (i.e., large distances) from the data center, and so communications may occur over lower cost connections, which can mean lower capacity and/or lower reliability (even unguaranteed) connections.

SUMMARY

In accordance with the present disclosure, a method among a plurality of nodes that implement a distributed key-value store, may include the master node receiving a publish request that specifies one or more key-value pairs which comprise the distributed key-value store. For each key-value pair in the one or more key-value pairs, the master node may store the key-value pair in a retransmit buffer. The master node may send the key-value pair to nodes in a set of first nodes using a communication protocol of a first kind that is an unreliable communication protocol. The master node may identify at most only a subset of nodes in a set of second nodes based on the key-value pair and send the key-value pair only to nodes in the subset using a reliable communication protocol. The master node may receive retransmit requests only from nodes in the set of first nodes and, in response, access key-value pairs from the retransmit buffer associated with the retransmit requests and resend the accessed key-value pairs to first nodes that sent the retransmit requests.

In accordance with the present disclosure, a non-transitory computer-readable storage medium having stored thereon instructions for controlling a computer system in a distributed key-value storage system comprising a set of first nodes and a set of second nodes. The instructions may be configured to control the computer system to receive a publish request that specifies one or more key-value pairs which comprise the distributed key-value store. For each key-value pair in the one or more key-value pairs, the computer system may store the key-value pair in a retransmit buffer, and send the key-value pair to all first nodes in the set of first nodes using a communication protocol of a first kind that does not include a retransmit protocol mechanism. The computer system may identify at most only a subset of second nodes in the set of second nodes based on the key-value pair and send the key-value pair only to nodes in the subset of second nodes using a communication protocol of a second kind that includes a retransmit protocol mechanism. The computer system may receive retransmit requests only from nodes in the set of first nodes and, in response, access key-value pairs from the retransmit buffer associated with the retransmit requests resend the accessed key-value pairs to first nodes that sent the retransmit requests.

In accordance with the present disclosure, a distributed key-value storage system may comprising a master node comprising a computer processor, a set of first nodes, and a set of second nodes. The distributed key-value storage system may include computer-readable storage medium comprising instructions for controlling the computer processor to receive a publish request having one or more key-value pairs that comprise the distributed key-value store. For each key-value pair in the one or more key-value pairs, the computer processor may store the key-value pair in a retransmit buffer and send the key-value pair to all first nodes in the set of first nodes using a communication protocol of a first kind that does not include a retransmit protocol mechanism. The computer processor may identify at most a subset of second nodes in the set of second nodes based on the key-value pair and send the key-value pair only to nodes in the subset of second nodes using a communication protocol of a second kind that includes a retransmit protocol mechanism. The computer processor may receive retransmit requests only from nodes in the set of first nodes, and in response access key-value pairs from the retransmit buffer associated with the retransmit requests and resend the accessed key-value pairs to first nodes that sent the retransmit requests.

The following detailed description and accompanying drawings provide a more detailed understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
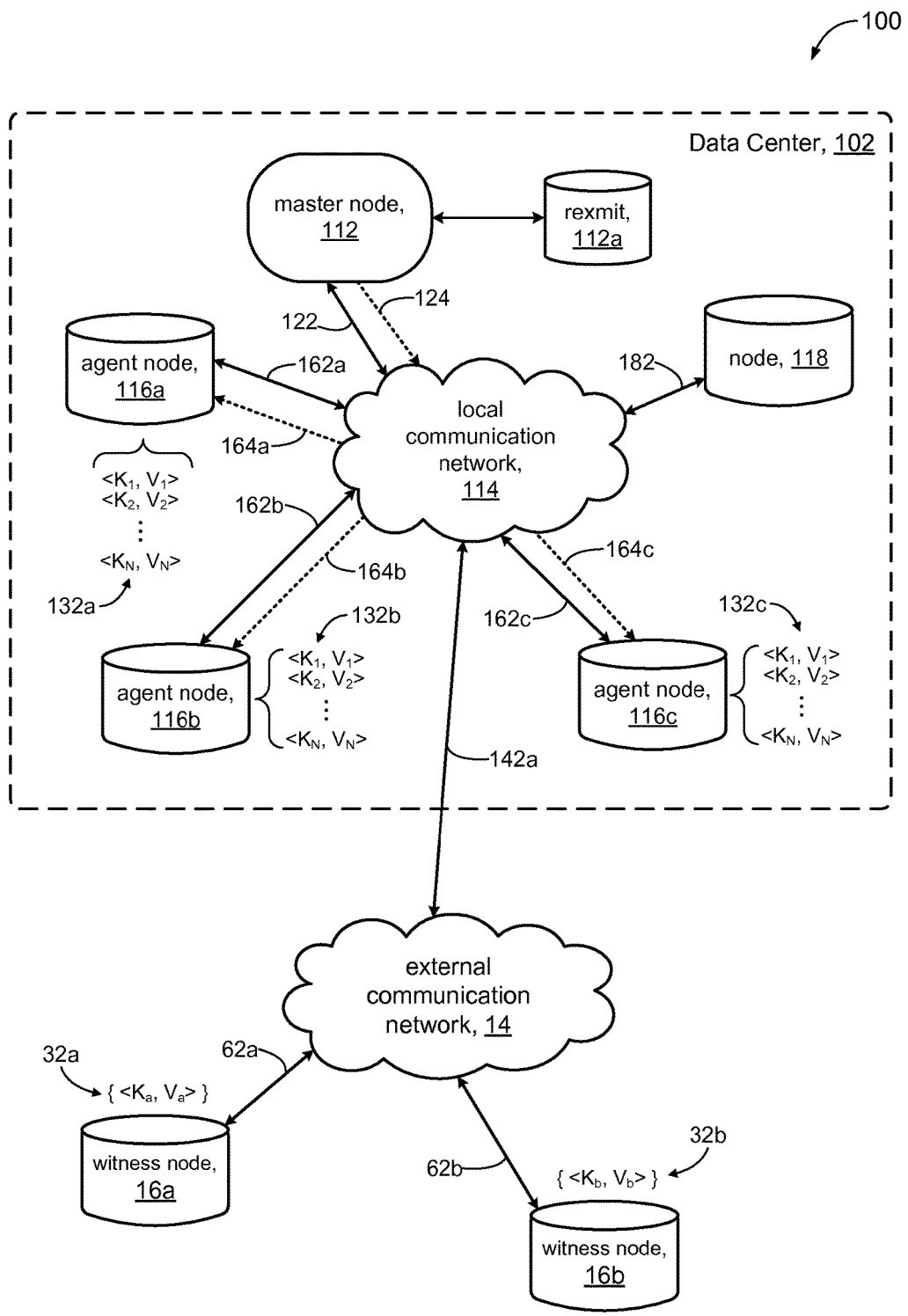
FIG. 1 illustrates a data system with a distributed KV store in accordance with the present disclosure.

FIG. 1 shows a data system 100 in accordance with some embodiments. The data system 100 may support the data needs of an enterprise. Merely as an example, the data system 100 may provide customer relationship management (CRM) services, or enterprise resource planning (ERP), or human resources (HR) support, and so on. In accordance with some embodiments, the data system 100 may include a data center 102 configured to support a distributed key-value (KV) store.

The data center 102 may comprise a plurality of nodes 112, 116a-116c, 118. In some embodiments, the nodes 112, 116a-116c, 118 may be computer systems with local data storage, virtual machines having local physical data storage or local virtual data storage, and so on. The data center 102 may include a master node 112 and a retransmit buffer 112a that is maintained by the master node 112.

The KV store may be distributed among some of the nodes in the data center 102, referred to as agent nodes 116a, 116b, 116c. In some embodiments, one or more agent nodes 116a, 116b, 116c may contain entire respective copies 132a, 132b, 132c of the KV store. The agent nodes 116a-116c may manage their own respective copies 132a-132c of the KV store. Users may access the KV store by accessing a copy 132a-132c of the KV store via a respective agent node 116a-116c. In some embodiments, other nodes 118 in the data center 102 that do not have a copy of the KV store may communicate with an agent node 116a-116c in order to provide users with access to KV store.

As different users in the data center 102 access the KV store from different nodes 116a-116c to read and/or write to the KV store, copies 132a-132c of the KV store will diverge from each other. It is important to maintain data consistency across the copies 132a-132c of the KV store managed by the respective agent nodes 116a-116c. Accordingly, the data center 102 may include a master node 112 configured to coordinate updates among the copies 132a-132c of the KV store in order to maintain data consistency in the data center 102. In some embodiments, the master node 112 may include a local copy (not shown) of the KV store.

The data center 102 may include a local communication network 114. The local communication network 114 may comprise one or more data switches (not shown) to route data among nodes 112, 116a-116c, 118 in the data center 102. The local communication network 114 may further comprise communication lines (not shown) that connect the nodes 112, 116a-116c, 118 to the local communication network 114. In some embodiments, the communication lines may be high speed data lines, such a fiber optic cables.

It will be appreciated, however, that in other embodiments, the communication lines may be based on any suitable data transmission technology.

The local communication network 114 may support communication with the master node 112 over communication channels 122, 124. Likewise, agent nodes 116a, 116b, 116c may communicate with the local communication network 114 via respective communication channels 162a, 164a, 162b, 164b, 162c, 164c. The local communication network 114 may communicate with node 118 via communication channel 182. In some embodiments, the communication channels 122, 162a-162c, 164a-164c, and 182 may be supported by the communication lines (not shown) that connect the nodes 112, 116a-116c, 118 to local communication network 114.

In some embodiments, the communication channels 122, 162a-162c, 182 may be configured for unicast communication using, for example, the Transmission Control Protocol/Internet Protocol (TCP/IP). It will be appreciated that in other embodiments, other communication protocols (standardized protocols or proprietary protocols) may be used to provide unicast communication. Unicasting refers to one-to-one communication of data packets from a sending node to a receiving node. Unicast packets, by definition, are always sent from a single sending node to a single receiving node. The sending node can send data to the receiving node by sending the data using an address (e.g., an IP address) of the receiving node. Thus, for example, the master node 112 may send data directly to node 116b (via the local communication network 114) using an address of node 116b. In particular, the master node 112 may send a packet that includes the data and an address of node 116b to a switch (not shown) in the local communication network 114 that the master node 112 is connected to. The local communication network 114 may then route the packet to node 116b.

In accordance with embodiments of the present disclosure, the communication channels 124, 164a-164c may be configured for multicast communication using, for example, the Internet Group Management Protocol (IGMP) which uses the User Datagram Protocol (UDP) as the underlying transport mechanism. It will be appreciated that in other embodiments, other communication protocols (standardized protocols or proprietary protocols) may be used to provide multicast communication. Multicasting refers to one-to-many communication of data packets between a sending node and multiple receiving nodes that elect to participate in a specific multicast group. A sending node can send data to multiple receiving nodes by sending the data using an address (e.g., IP address) that specifies a single multicast address (e.g., an IP address), rather than to addresses of each receiving node.

One or more switches (not shown) that comprise the local communication network 114 may be configured to support multicasting. Nodes connected to a switch may register or otherwise inform the switch that they want to receive packets addressed to a given multicast address. When the switch receives a packet from a sending node that includes the given multicast address, the switch may send the packet to each node that has registered to receive data packets addressed with the given multicast address.

Thus, for example, agent nodes 116a-116c may register with a switch (not shown) in the local communication network 114 to receive packets addressed to a given multicast address. When the master node 112 sends data to the switch that includes the given multicast address, the switch in turn will multicast the data to each node 116a-116c via the local communication network 114.

In accordance with the present disclosure, the KV store may be further distributed among nodes 16a, 16b, referred to as witness nodes, that are outside of the data center 102. In some embodiments, the witness nodes 16a, 16b store only subsets of the KV store. For example, witness node 16a may store a subset 32a of the KV store and witness node 16b may store a subset 32b of the KV store which may be the same or a different from subset 32a. The witness nodes 16a, 16b may communicate with the data center 102 via an external communication network 14; for example, a public switched telephone network, a wide area network, and so on. A communication channel 142 may connect the local communication network 114 to the external communication network 14. The witness nodes 16a, 16b may have respective communication channels 62a, 62b to the external communication network 14.

As mentioned above, the agent nodes 116a-116c may provide access to, and otherwise manage, their respective copies 132a-132c of the KV store. When one or more changes are made to a given copy (e.g., 132a) of the KV store, those changes should be distributed to the other copies (e.g., 132b, 132c) of the KV store in order to maintain data consistency among copies 132a-132c of the KV store.

In some embodiments, an agent node 116a-116c may "publish" the change(s) made to its respective copy 132a-132c of the KV store. For example, if an existing KV pair (also referred to herein as an "entry") in the KV store is modified, the agent node 116a-116c may send a publish request to the master node 112. The publish request may include the modified entry. If a new entry is added, the publish request may include the added entry. If an existing entry is deleted, the publish request may include an identifier of the deleted entry. The changes may be distributed to other agent nodes and witness nodes in order to maintain data consistency.

Figure 2:
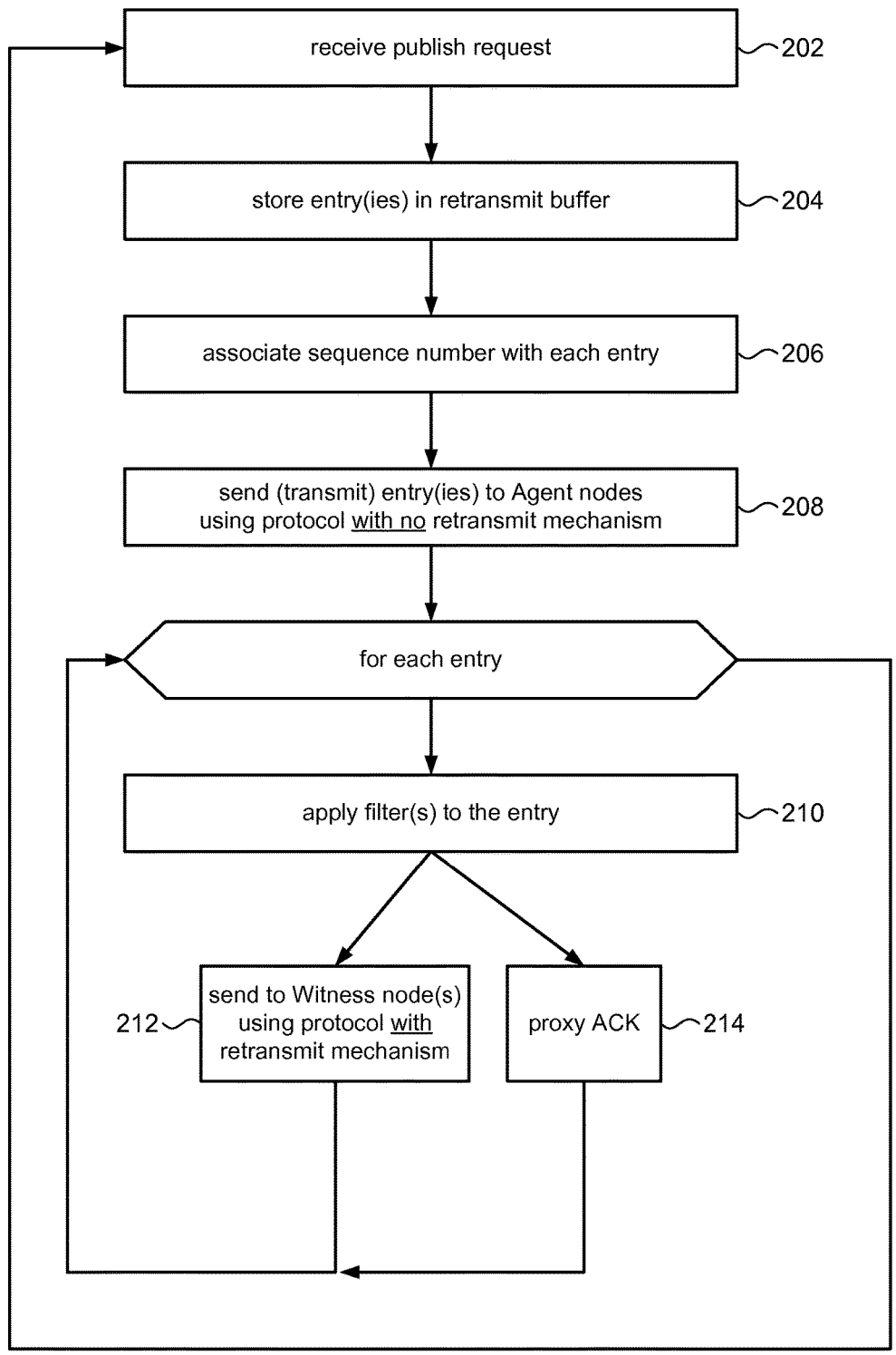
FIGS. 2 and 2A illustrate processing a publish request in accordance with the present disclosure.
Figure 2A:
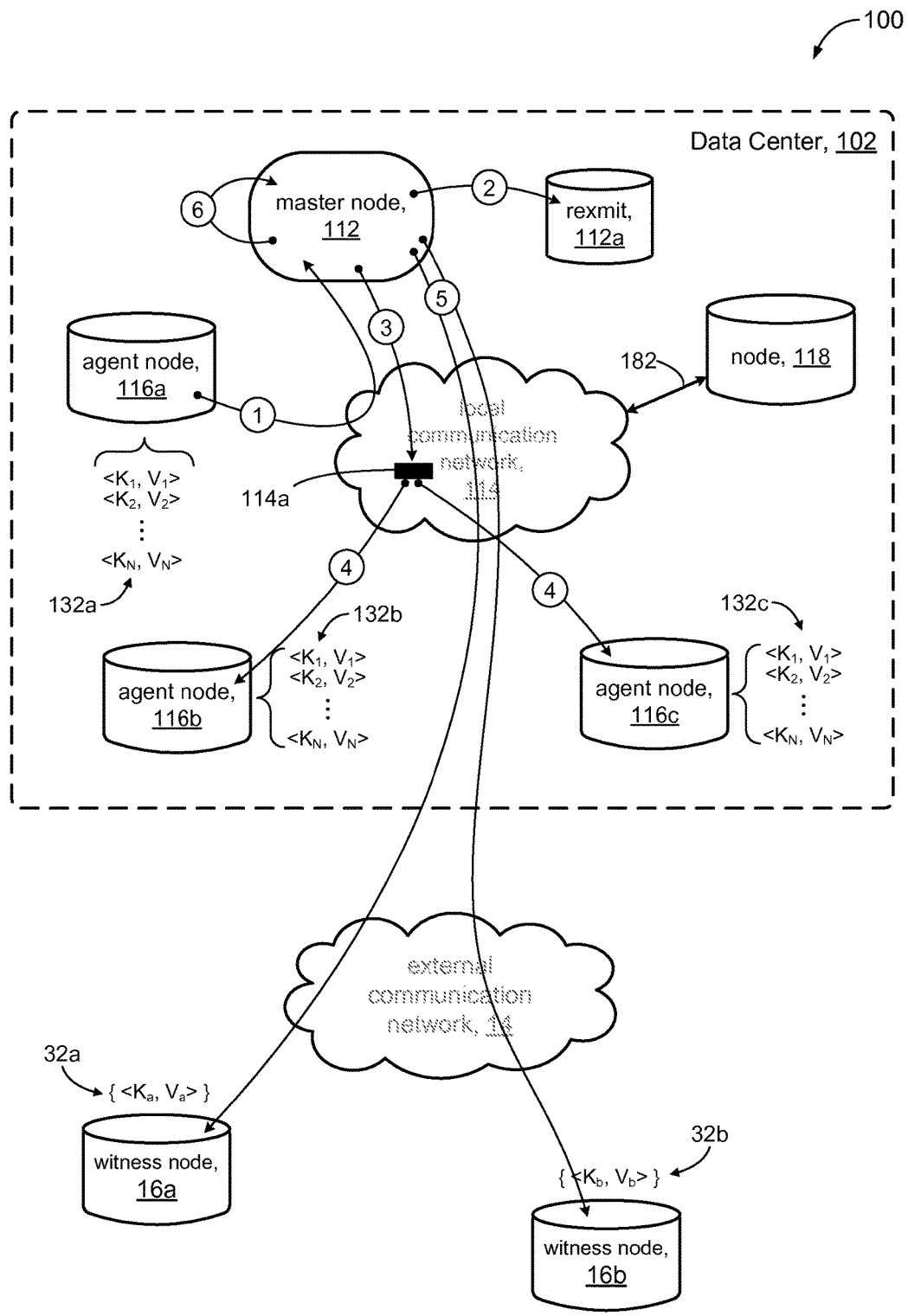

FIGS. 2 and 2A illustrate a process flow in the master node 112 for handling a received publish request, in accordance with the present disclosure. At block 202, the master node 112 may receive a publish request, from an agent node (e.g., 116a). The publish request may be sent via TCP/IP or other suitable communication protocol. FIG. 2A shows an example (identified by a circled "1") of agent node 116a sending a publish request, and the master node 112 receiving the publish request. In some embodiments, the publish request may include updates of one or more entries that need to be distributed to other agent nodes and witness nodes. The master node 112 may process each entry on an individual basis for distribution.

In some embodiments, the communication protocol used by the master node 112 to distribute entry updates using a communication protocol does not support a retransmit mechanism. For example conventional IGMP does not define a retransmit protocol. Accordingly, the data system 100 may implement an application-level retransmit mechanism. In some embodiments, the application-level retransmit mechanism may include a retransmit buffer 112a (FIG. 1) managed by the master node 112. At block 204, the master node 112 may store each entry received in the publish request in the retransmit buffer 112a (circled "2" in FIG. 2A).

The application-level retransmit mechanism may further include sequence numbers that are associated with each entry identified or otherwise specified in the publish request. In some embodiments, the sequence numbers may monotonically increase with each entry that is sent. As will be discussed in more detail below, the agent nodes 116a-116c may use the sequence numbers to determine that they are missing an entry. At block 206, the master node 112 may associate a sequence number with each entry identified in the received publish request. The sequence number may be incremented with each entry.

As noted above, each agent node 116a-116c includes a complete respective copy 132a-132c of the KV store. Accordingly, when a change occurs in a copy (e.g., 132a) of the KV store, the other copies (e.g., 132b, 132c) of the KV store should be similarly changed in order to maintain data consistency of the KV store among the agency nodes 116a-116c. At block 208, the master node 112 may send each entry and its associated sequence number in a data packet to the agent nodes 116a-116c. In some embodiments, the master node 112 may multicast the data packet to the agent nodes 116a-116c. For example, the master node 112 may send the data packet to a multicaster 114a (FIG. 2A) in the local communication network 114 using a single multicast address. This communication is illustrated in FIG. 2A by the circled "3." The multicaster 114a may be a switch (not shown) in the local communication network 114 or a component or functionality in that switch, configured to perform the multicasting function. Multicasting may be preferred in order to avoid having too much communications going on in the master node 112.

When the local communication network 114 (FIG. 1) receives the data packet having a multicast address, the multicaster 114a may handle the multicast processing. For example, the multicaster 114a may have a list of agent nodes 116a-116c that had previously registered with the multicaster 114a to receive multicast packets. The multicaster 114a may send the data packet to each agent node 116a-116c in that list. This set of communications is illustrated in FIG. 2A by the circled "4." In some embodiments, the communication protocol used in the multicast communication may be the IGMP protocol.

In accordance with the present disclosure, some entries may be sent to the witness nodes 16a, 16b. Recall, that witness nodes 16a, 16b contain only subsets 32a, 32b of the KV store. In some embodiments, one or more filters (e.g., rules) may be applied to each entry to determine whether or not a given entry should be sent to a witness node 16a, 16b.

Accordingly, at block 210, for each entry, the master node 112 may apply one or more filters to determine if that entry should be sent to a witness node 16a, 16b, and if so to which witness node(s). For example, a filter may specify that entries of a certain type should be sent to a particular witness node. For each filter, one or more witness nodes may be identified for receiving the entry. Accordingly at block 212, the master node 112 may send the entry and its associated sequence number directly to those witness nodes using their respective addresses. In accordance with the present disclosure, for example, the TCP/IP protocol may be used. This communication is illustrated in FIG. 2A by the circled "5." For any witness nodes that were filtered out for receiving the entry, at block 214 the master node 112 may issue a "proxy ACK" on behalf of those witness nodes. This aspect of the present disclosure is illustrated in FIG. 2A by the circled "6" and will be discussed further below.

When each entry identified in the received publish request has been filtered, processing in the master node 112 may return to block 202 to wait for and process the next publish request.

The discussion will now turn to retransmission processing. As mentioned above, in accordance with the present disclosure, the master node 112 and agent nodes 116a-116c may provide an application-level retransmit mechanism. In some embodiments, the application-level retransmit mechanism may include retransmit buffer 112a and the use of monotonically increasing sequence numbers. The application-level retransmit mechanism is at the "application level" in that program code for implementing the functionality of the master node 112 include program code to process the retransmit buffer 112a and to process sequence numbers. Likewise, the functionality of the agent nodes 116a-116c include program code to process the sequence numbers.

This application-level retransmit mechanism is distinct and different from a protocol-level retransmit mechanism. For example, the TCP protocol defines a retransmit mechanism within the definition of the TCP protocol; TCP is an example of a reliable communication protocol, and more specifically an example of a reliable unicast communication protocol. The TCP definition includes a mechanism for performing retransmission of packets when a receiving node fails to ACK the sending node within a given period of time. Since the retransmission processing occurs at the protocol level, the application (e.g., master node 112, agent nodes 116a-116c) does not need to include program code to handle retransmissions in communications that use TCP/IP.

As explained above in FIG. 2, when the master node 112 processes a publish request, the master node 112 may multicast each entry to the agent nodes 116a-116c. In some embodiments, the communication protocol used to multicast the entry may be the IGMP protocol. The IGMP definition does not include a retransmit mechanism in definition of the protocol; IGMP is an example of an unreliable communication protocol, and with respect to multicast communication, IGMP is an example of an unreliable multicast communication protocol. Accordingly, master node 112 and agent nodes 116a-116c provide an application-level retransmission mechanism to accommodate for the possibility of lost packets sent using IGMP. As discussed above, in some embodiments the sequence numbers associated with each entry (e.g., block 206, FIG. 2) that the master node 112 sends to an agent node 116a-116c are a part of the application-level retransmit mechanism.

Figure 3:
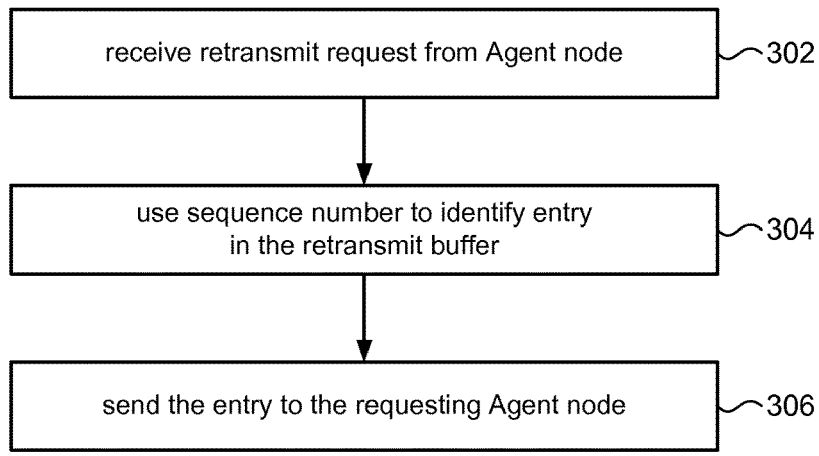
FIG. 3 illustrates retransmit processing in accordance with the present disclosure.

FIG. 3 illustrates retransmit processing in accordance with the present disclosure. At block 302, the master node 112 may receive a retransmit request from an agent node 116a-116c to resend one or more given entries. In some embodiments, the retransmit request may include one or more sequence numbers, one for each entry that is being requested for retransmission. It is noted here that witness nodes 16a, 16b do not need to send a retransmit request from the application level to resend a given entry because the master node 112 sends the entry to witness nodes 16a, 16b using TCP/IP (e.g., block 212, FIG. 2), which as explained above, includes a retransmit mechanism defined in the TCP protocol. Accordingly, the master node 112 may not receive retransmit requests from witness nodes 16a, 16b.

At block 304, the master node 112 may use the sequence number(s) in the retransmit request to identify and retrieve the associated entry from the retransmit buffer 112a. At block 306, the master node 112 may send the retrieved entry to the agent node 116a-116c that sent the retransmit request. In some embodiments, the master node 112 may send the entry directly to the agent node 116a-116c using a communication protocol that has a retransmit mechanism defined in the protocol, for example, TCP/IP.

Blocks 304 and 306 may be repeated for each sequence number identified or otherwise specified in the retransmit request. The master node 112 may then continue processing at block 302 to wait for and process the next retransmit request.

The discussion will now turn to the retransmit buffer 112a component of the application-level retransmit mechanism. Since the value component of a key-value pair (entry) can be any arbitrary data, an entry can be very large in size. Therefore, the storage requirement of the retransmit buffer 112a can become significant if every entry is kept. In accordance with the present disclosure, the retransmit buffer 112a may be managed during the processing of "heartbeat" messages.

In some embodiments, agent nodes 116a-116c and witness nodes 16a-16b may send heartbeat messages to the master node 112. The heartbeat message may be used to provide information to the master node 112 about the operating condition of the agent nodes 116a-116c and witness nodes 16a, 16b. In accordance with the present disclosure, for example, the heartbeat message may include information relating to the processing of an entry received by an agent node 116a-116c or witness node 16a, 16b. For example, when an agent node 116a-116c or witness node 16a, 16b successfully updates its respective local copy 132a-132c, 32a-32b of the KV store with the received entry (committing the entry), that node may ACK the master node 112 with respect to the successfully committed entry.

Figure 4:
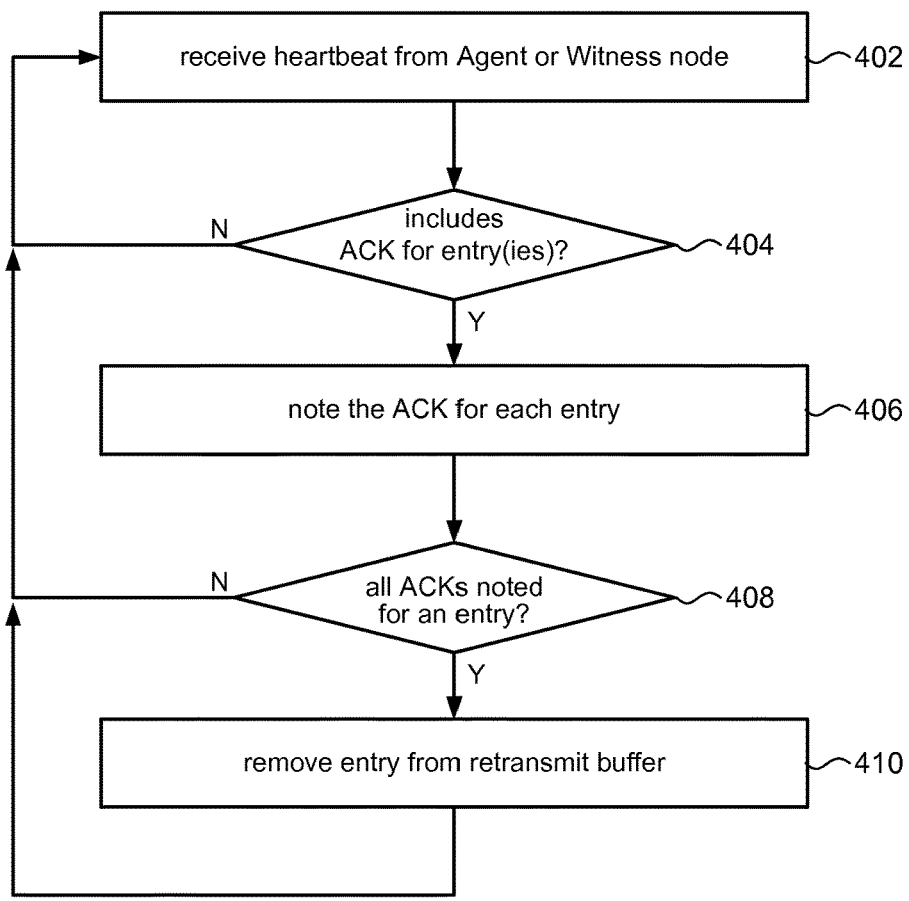
FIG. 4 illustrates heartbeat processing in accordance with the present disclosure.

FIG. 4 illustrates heartbeat processing in accordance with some embodiments of the present disclosure. At block 402, the master node 112 may receive a heartbeat message from a node 116a-116c, 16a, 16b. At decision block 404, if the received heartbeat message does not include an ACK, then the master node 112 may process other information that may be contained in the heartbeat message. The master node 112 may return to block 402 to wait for and process another heartbeat message.

If, at decision block 404, the received heartbeat message includes an ACK, then at block 406 the master node 112 may make note of the ACK. Information that identifies the given entry may be included in the heartbeat message. For example, the heartbeat message may include the sequence number that is associated with the given entry (e.g., block 206, FIG. 2).

In some embodiments, at block 406, the master node 112 may maintain an array of sequence numbers. The array may have a slot for each agent node 116a-116c and witness node 16a, 16b. When an ACK is received in a heartbeat message, the master node 112 may note the ACK by recording the sequence number, included in the heartbeat message, in a slot in the array that corresponds to the agent node 116a-116c or witness node 16a, 16b that sent the ACK.

In other embodiments, at block 406, the master node 112 may maintain an ACK counter for each entry that has been sent (e.g., at blocks 208 and 212, FIG. 2). When an ACK is received in a heartbeat message, the master node 112 can identify the ACK counter associated with the entry using the sequence number contained in that heartbeat message. The master node 112 may increment the ACK counter to make note of the ACK, indicating that one more agent node 116a-116c or witness node 16a, 16b has committed the corresponding entry.

At decision block 408, if the master node 112 has noted that an ACK for a given entry has been received from all agent nodes 116a-116c and witness nodes 16a, 16b, then at block 410 the master node 112 may remove the given entry from the retransmit buffer 112a. This frees up the storage requirement of the retransmit buffer 112a, since entries that have been committed in every agent node 116a-116c and witness node 16a, 16b no longer need to be kept.

For example, in embodiments that use an array of sequence numbers described above, processing in decision block 408 by master node 112 may proceed as follows. The lowest noted sequence number in the array corresponds to the entry that has been committed by all the agent nodes 116a-116c and witness nodes 16a, 16b. In addition, entries having sequence numbers less than the lowest noted sequence number have also been committed by all the agent nodes 116a-116c and witness nodes 16a, 16b. Accordingly, the master node 112 may remove entries from the retransmit buffer 112a that are associated with the lowest noted sequence number and with sequence numbers less than the lowest noted sequence number.

In embodiments that use an ACK counter described above, processing in decision block 408 by master node 112 may proceed as follows. When the ACK counter associated with a given entry equals the number of agent nodes 116a-116c and witness nodes 16a, 16b in the data system 100, the given entry may be deemed to have been committed by every agent node 116a-116c and witness node 16a, 16b. Accordingly, the master node 112 may remove the entry from the retransmit buffer 112a that is associated with the ACK counter.

If, at decision block 408, not all ACKs have been noted, the master node 112 may return to block 402 to wait for another heartbeat message.

The discussion will now turn to the proxy ACK discussed above. In some embodiments, the processing in decision block 408 may assume that entries received in a publish request (block 202, FIG. 2) are sent to all agent nodes 116a-116c and witness nodes 16a, 16b, and that each such node will send an ACK when the entry is committed. However, as explained above, some witness nodes 16a, 16b may be filtered (block 210, FIG. 2) for a given entry, and the given entry will not be sent to those witness nodes 16a, 16b. So, in fact, some witness nodes will not receive certain entries and ACKs will not be received from those witness nodes for those entries, thus contradicting the assumption made in the processing of block 408.

In accordance with the present disclosure, in order for the foregoing assumption in the processing of decision block 408 to hold, the master node 112 may issue a "proxy" ACK (block 214, FIG. 2) for each filtered witness node that does not receive a given entry. Since the filtered witness node will never send an ACK for the given entry, the master node 112 may serve as a proxy for that filtered witness node for the given entry and issue a proxy ACK, thus simulating the reception of an ACK from the filtered witness node.

Accordingly, in embodiments that use an array of sequence numbers, when the master node 112 issues a proxy ACK on behalf of a witness node, the master node 112 at block 406 may note the proxy ACK by recording the sequence number (included in the proxy ACK) of the entry that was NOT sent to the witness node in a slot in the array that corresponds to the witness node. The array will therefore show that an ACK was received for an entry, even though the entry was not sent to witness node and the witness node did not send an ACK.

In embodiments that use an ACK counter, when the master node 112 issues a proxy ACK on behalf of a witness node, the master node 112 at block 406 may identify the ACK counter associated with the entry that was NOT sent to the witness node. The master node 112 may increment the ACK counter to make note of the proxy ACK. The ACK counter will therefore indicate that an ACK was received for the associated entry, even though the entry was not sent to witness node and the witness node did not send an ACK.

Figure 5:
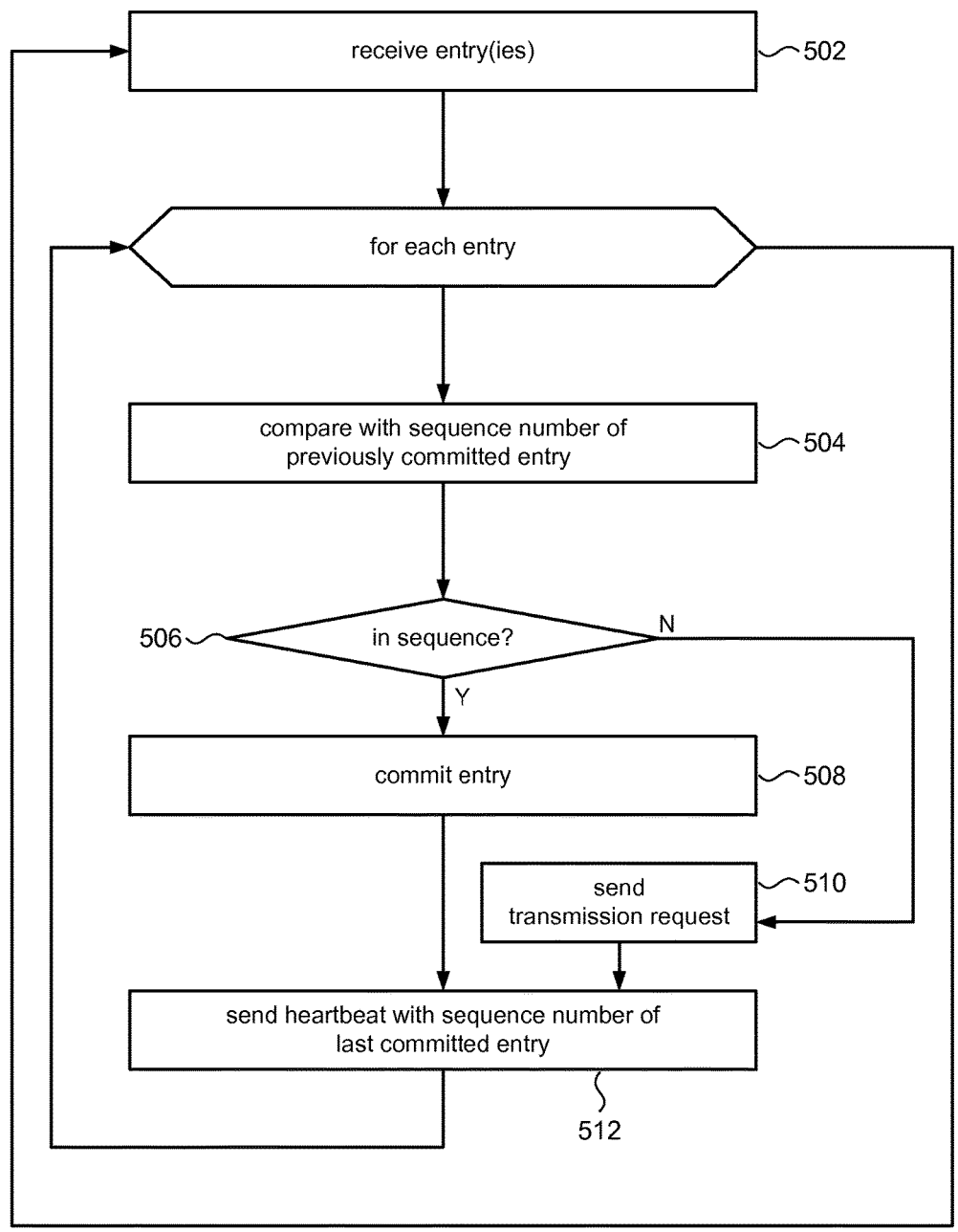
FIG. 5 illustrates processing in an agent node or a witness node in accordance with the present disclosure.

FIG. 5 illustrates an example of processing in a node (e.g., agent node 116a-116c or witness node 16a, 16b) in accordance with the present disclosure. At block 502, the node may receive a data packet containing one or more entries and one or more respective associated sequence numbers, from the master node 112. In the case of an agent node 116a-116c, the data packet may be sent indirectly by the master node 112 using a single multicast address to a multicaster 114a (FIG. 2A), and then from the multicaster 114a to the node. In the case of a witness node 16a, 16b, the data packet may be sent directly by the master node 112 using an address of the node.

At block 504, for each entry, the node may compare the sequence number associated with the entry with the sequence number of the previously committed entry.

At decision block 506, if the sequence numbers are in sequence, the processing may proceed to block 508. If the sequence numbers are not in sequence, the entry is not processed and processing may return to block 502 to receive another entry. Since the master node 112 monotonically increments the sequence number with each successive entry that is sent, the node expects to see an unbroken sequence of sequence numbers with successive entries received at block 502. For example, if the sequence number of the previously committed entry is N, then the sequence number in the next received entry should be in sequence; i.e., the next sequence number should be N+1. If the sequence number is other than N+1, then the node may conclude that an entry has been lost.

Agent nodes 116a-116c may experience missed packets since the master node 112 may multicast entries using IGMP, which does not have a protocol-level retransmit mechanism. Accordingly, if the node is an agent node 116a-116c, then processing may proceed from the NO branch of decision block 506 to block 510 where a request for retransmission may be sent to the master node 112, requesting missing sequence numbers. Master node 112 and agent nodes 116a-116c may include program code to implement the application-level retransmit mechanism described above, which includes the sequence numbers.

By comparison, the master node 112 may send entries to the witness nodes 16a, 16b using TCP/IP. The TCP protocol includes a protocol-level retransmit mechanism, and should not experience missed packets.

At block 508, the node may "commit" the entry, for example, by updating its local KV store with the received entry. The node may also update a local memory store with the sequence number associated with the entry that was just committed.

At block 512, the node may send a heartbeat message to the master node 112. In accordance with the present disclosure, the node may include the value currently stored in the local memory store. This value is the sequence number of the latest entry that was committed by the node.

Figure 6:
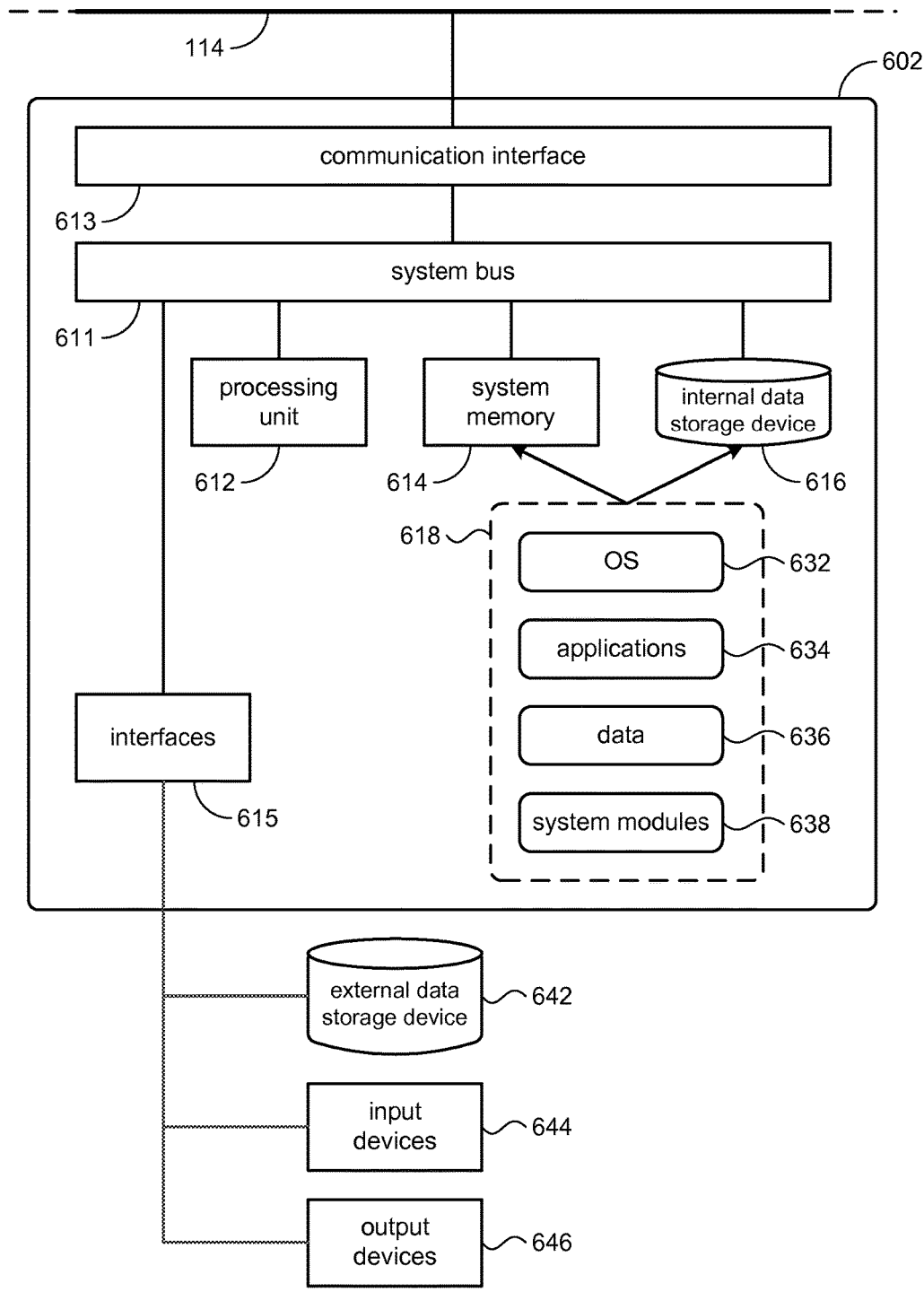
FIG. 6 is an illustrative example of a computer system in accordance with the present disclosure.

Referring to FIG. 6, an illustrative implementation of a node (e.g., 112, 116a-116c, 118, 16a, 16b, FIG. 1) may include a computer system 602 having a processing unit 612, a system memory 614, and a system bus 611. The system bus 611 may connect various system components including, but not limited to, the processing unit 612, the system memory 614, an internal data storage device 616, and a communication interface 613.

The processing unit 612 may comprise a single-processor configuration, or may be a multi-processor architecture. The system memory 614 may include read-only memory (ROM) and random access memory (RAM). The internal data storage device 616 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on). In a configuration where the computer system 602 is a mobile device, the internal data storage 616 may be a flash drive.

The internal data storage device 616 and its associated non-transitory computer-readable storage media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 614 and/or the internal data storage device 616 may store a number of program modules, including an operating system 632, one or more application programs 634, program data 636, and other program/system modules 638. For example, in a computer system 602 configured as the master node 112, for example, the application programs 634, which when executed, may cause the computer system 602 to perform method steps of FIGS. 2-4. In some embodiments, the system memory 614 and/or internal data storage device 616 may provide storage for the retransmit buffer 112a.

An external data storage device 642 may be connected to the computer system 602. For example, in a computer system 602 configured as the media server 202, the external data storage device 642 may be the data store 212b of pre-recorded media streams 102b.

Access to the computer system 602 may be provided by a suitable input device 644 (e.g., keyboard, mouse, touch pad, etc.) and a suitable output device 646, (e.g., display screen). In a configuration where the computer system 602 is a mobile device, input and output may be provided by a touch sensitive display.

The computer system 602 may operate in a networked environment using logical connections via wired and/or wireless communications to one or more remote computers (not shown) over the local communication network 114.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method among a plurality of nodes that implement a distributed key-value store, the plurality of nodes comprising a set of first nodes within a data center, a set of second nodes outside of the data center, and a master node, the method comprising the master node:

storing a complete copy of the key-value store in each of the first nodes;
　storing at most a portion of the key-value store in each of the second nodes;

receiving a publish request that specifies one or more key-value pairs which comprise the distributed key-value store;
for each key-value pair specified in the publish request:
storing the key-value pair in a buffer; and
sending the key-value pair to all first nodes in the set of first nodes using an unreliable multicast communication protocol;
for each key-value pair in the buffer:
identifying at most only a subset of second nodes in the set of second nodes based on the key-value pair; and
sending the key-value pair only to nodes in the subset of second nodes using a reliable unicast communication protocol;
receiving an ACK from each of the first and second nodes to which a first key-value pair in the buffer was sent;
generating a proxy ACK for each of the second nodes that were not sent the first key-value pair; and
freeing up space in the buffer by deleting the first key-value pair from the buffer when the first key-value pair is associated with (i) a received ACK from every first node and second node to which a first key-value pair was sent and (ii) a proxy ACK for every second node that was not sent the first key-value pair.

2. The method of claim 1, wherein sending the key-value pair to all first nodes includes the master node sending the key-value pair to a multicaster using a single multicast address, wherein the key-value pair is sent from the multicaster to each of the first nodes using addresses of the first nodes, wherein sending the key-value pair only to nodes in the subset of second nodes includes the master node sending the key-value pair to each node in the subset of second nodes using addresses of the nodes in the subset of second nodes.

3. The method of claim 1, further comprising the master node resending the accessed key-value pairs to requesting nodes in the set of first nodes using addresses of the requesting nodes.

4. The method of claim 1, further comprising the master node associating a monotonically increasing sequence number managed by the master node with each key-value pair in the one or more key-value pairs received in the publish request, wherein each key-value pair that is sent to a node is sent with its associated sequence number.

5. The method of claim 1, further comprising the master node:
making note of acknowledgements of a given key-value pair received from nodes in the set of first nodes and in the subset of second nodes to which the key-value pair was sent;
making note of acknowledgements of the given key-value pair as a proxy for nodes in the set of second nodes to which the key-value pair was not sent; and
removing the given key-value pair from the buffer when acknowledgements of the given key-value pair have been noted for each node in the first set of nodes and the second set of nodes.

6. A non-transitory computer-readable storage medium having stored thereon instructions for controlling a computer system in a distributed key-value storage system comprising a set of first nodes within a data center that each store a complete copy of the key-value store and a set of second nodes outside of the data center that each store at most a portion of the key-value store, the instructions configured to control the computer system to:
receive a publish request that specifies one or more key-value pairs which comprise the distributed key-value store;
for each key-value pair specified in the publish request:
store the key-value pair in a buffer; and
send the key-value pair to all first nodes in the set of first nodes using an unreliable multicast communication protocol;
for each key-value pair in the buffer:
identify at most only a subset of second nodes in the set of second nodes based on the key-value pair; and
send the key-value pair only to nodes in the subset of second nodes using a reliable unicast communication protocol;
receive an ACK from each of the first and second nodes to which a first key-value pair in the buffer was sent;
generate a proxy ACK for each of the second nodes that were not sent the first key-value pair; and
free up space in the buffer by deleting the first key-value pair from the buffer when the first key-value pair is associated with (i) a received ACK from every first node and second node to which a first key-value pair was sent and (ii) a proxy ACK for every second node that was not sent the first key-value pair.

7. The non-transitory computer-readable storage medium of claim 6, wherein sending the key-value pair to all first nodes includes the computer system sending the key-value pair to a multicaster using a single multicast address, wherein the key-value pair is sent from the multicaster to each of the first nodes using addresses of the first nodes, wherein sending the key-value pair only to nodes in the subset of second nodes includes the computer system sending the key-value pair to each node in the subset of second nodes using addresses of the nodes in the subset of second nodes.

8. The non-transitory computer-readable storage medium of claim 6, further comprising the computer system resending the accessed key-value pairs to requesting nodes in the set of first nodes to addresses of the requesting nodes.

9. The non-transitory computer-readable storage medium of claim 6, further comprising the computer system associating a monotonically increasing sequence number managed by the computer system with each key-value pair in the one or more key-value pairs received in the publish request, wherein each key-value pair that is sent to a node is sent with its associated sequence number.

10. The non-transitory computer-readable storage medium of claim 6, further comprising the computer system:
making note of acknowledgements of a given key-value pair received from nodes in the set of first nodes and in the subset of second nodes to which the key-value pair was sent;
making note of acknowledgements of the given key-value pair as a proxy for nodes in the set of second nodes to which the key-value pair was not sent; and
removing the given key-value pair from the buffer when acknowledgements of the given key-value pair have been noted for each node in the first set of nodes and the second set of nodes.

11. A distributed key-value storage system comprising:
a master node comprising a computer processor;
a set of first nodes in a datacenter, each first node having a complete copy of the key-value store;
a set of second nodes outside of the datacenter, each second node having at most a portion of the key-value store; and
a computer-readable storage medium comprising instructions for controlling the computer processor to:
receive a publish request having one or more key-value pairs that comprise the distributed key-value store;

for each key-value pair specified in the publish request:
    store the key-value pair in a buffer; and
    send the key-value pair to all first nodes in the set of first nodes using an unreliable multicast communication protocol;
for each key-value pair in the buffer:
    identify at most a subset of second nodes in the set of second nodes based on the key-value pair; and
    send the key-value pair only to nodes in the subset of second nodes using a reliable unicast communication protocol;
receive an ACK from each of the first and second nodes to which a first key-value pair in the buffer was sent;
generate a proxy ACK for each of the second nodes that were not sent the first key-value pair; and
free up space in the buffer by deleting the first key-value pair from the buffer when the first key-value pair is associated with (i) a received ACK from every first node and second node to which a first key-value pair was sent and (ii) a proxy ACK for every second node that was not sent the first key-value pair.

12. The system of claim 11, wherein sending the key-value pair to all first nodes includes the master node sending the key-value pair to a multicaster using a single multicast address, wherein the key-value pair is sent from the multi-caster to each of the first nodes using addresses of the first nodes, wherein sending the key-value pair only to nodes in the subset of second nodes includes the master node sending the key-value pair to each node in the subset of second nodes using addresses of the nodes in the subset of second nodes.

13. The system of claim 11, wherein the multicaster is a communication switch that the master node is connected to.

14. The system of claim 11, further comprising the master node resending the accessed key-value pairs to requesting nodes in the set of first nodes to addresses of the requesting nodes.

15. The system of claim 11, wherein the unreliable multicast communication protocol is the Internet Group Management Protocol (IGMP), wherein the reliable unicast communication protocol is the Transmission Control Protocol (TCP).

16. The system of claim 11, further comprising the master node associating a monotonically increasing sequence number managed by the master node with each key-value pair in the one or more key-value pairs received in the publish request, wherein each key-value pair that is sent to a node is sent with its associated sequence number.

17. The system of claim 11, further comprising the master node:
    making note of acknowledgements of a given key-value pair received from nodes in the set of first nodes and in the subset of second nodes to which the key-value pair was sent;
    making note of acknowledgements of the given key-value pair as a proxy for nodes in the set of second nodes to which the key-value pair was not sent; and
    removing the given key-value pair from the buffer when acknowledgements of the given key-value pair have been noted for each node in the first set of nodes and the second set of nodes.

18. The system of claim 11, wherein the master node and the set of first nodes constitute a data center and the set of second nodes are outside of the data center.

* * * * *